Jan. 19, 1932. A. ORANGES 1,841,377
SYNCHRONOUS DRIVE FOR SOUND RECORDS
Filed May 2, 1929
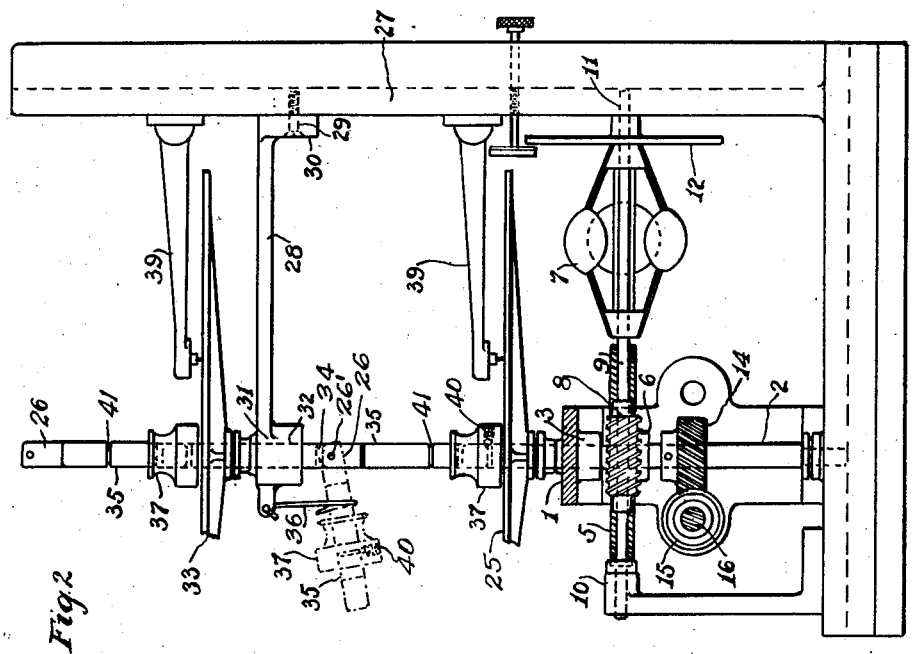
INVENTOR
Antonio Oranges
BY
Harold D. Penney ATTORNEY Patented Jan. 19, 1932

1,841,377

UNITED STATES PATENT OFFICE

ANTONIO ORANGES, OF NEW YORK, N. Y.

SYNCHRONOUS DRIVE FOR SOUND RECORDS

Application filed May 2, 1929. Serial No. 359,873.

My present invention relates to an improvement in phonographs and has for its object the provision of means in such mechanisms wherein two, or a plurality of duplicate records may be driven from a single drive spindle, such plural records being arranged in superposed vertical position and driven by a single drive means.

A further object is to provide a vertical drive shaft therefor with means whereby to permit of ease in replacement or removal of a plurality of records, and to insure a positive and simultaneous drive connection between such plural records.

These and other advantages will appear as the herein description proceeds and it is obvious that modifications may be made herein without departing from the spirit of the invention or the scope of the appended claims.

In the accompanying drawings:

Fig. 1 is a partially sectioned view of a characteristic phonograph structure showing provision for driving two records, in front elevation.

Fig. 2 is a partially sectioned view taken on the line 2—2, Fig. 1, showing further structural details; both of said views showing the vital parts of a phonograph structure with my improvements associated therewith.

Fig. 3 is an enlarged view of one of the vertical drive shafts showing the sleeve member in section and locked against the shaft, above the tongue and slot jointure of the two shafts.

Fig. 1, in detail, discloses the phonograph motor mechanism as comprising a cross platen 1, a characteristic drive through which there is mounted a vertically central drive spindle 2 which extends upwardly through a suitable bearing 3 in said platen 1, the lower end of said shaft being stepped in a ball thrust bearing 4 in base A. There is also located on this shaft a worm wheel 5 which is affixed to said shaft by a pin 6 to permit of driving a worm driven governor 7 through worm 8. The worm 8 and governor 7 are mounted upon a shaft 9 which is mounted in operative position in bearings 10 and 11, Fig. 2, the governor being of the usual so-called ball type and having a disk 12 which is in turn braked by the usual friction brake means 13 mounted in operative associate position. As this type of governor control and function are old and well known, they will not be further described.

The vertical drive shaft 2, Fig. 2, has a fixed helical gear 14 thereon this in turn meshing with a companion gear 15 which is fixedly mounted upon a transversely mounted main drive shaft 16, Fig. 1, this being in turn mounted upon its outer ends in bearings 17 and 18 which are provided in the opposite bearing brackets 19 and 20. The outer end of shaft 16 extends through bearing 18 and has fixedly mounted thereon one disk 21 of a vibration insulating driving joint or clutch, the other disk member 22 of which is attached to a fragmentary main motor drive shaft 23, both clutches being connected by a plurality of disk connecting driving dogs 24—24, in such a manner as to flexibly connect the driving disks together to positively drive shaft 16 in a manner to insulate the noise of the drive motor, not shown, which connects to shaft 23.

As thus shown, vertical shaft 2 is controllably driven to rotate the record turntable 25 mounted upon the upper end of said shaft, said turntable being fixedly mounted thereto in a rigid manner with the upper end of said shaft extending a slight distance above the plane of said turntable, as at Fig. 1.

At one side of the base A is located an upwardly extending side bracket 27, upon which is mounted an offset angle bracket arm 28 by means of screws 29 passing through the integral bracket foot 30 into the wall of bracket 27. The outer end of bracket 28 terminates in a shaft supporting bearing 31 through which is rotatably mounted a secondary, vertical turntable driving shaft 32, this latter shaft fixedly mounting a second upper turntable 33, both the shaft 32 and turntable 33 being in superposed axial alinement with the lower turntable 25 and its drive shaft 2.

The lower end of the shaft 32 is arranged with a slot 34 therein, and into this slot is pivotally fitted a tongued stub shaft 35, the tongue 26 of which is pivotally held by a pivot pin 26' to shaft 32. This arrangement permits shaft 35 to be swung out of alinement with shafts 32 and 2, to permit of placing and removal of phonograph records, not shown, upon and from the lower turntable 25, and to thereafter connect the upper turntable 33 for simultaneous drive through and by shaft 2, with turntable 25.

To enable the stub shaft 35 to be quickly and engageably positioned between said shafts 2 and 32 in a drive connection or to disconnect the same, there is arranged a bored, slidably fitted sleeve member 37 which is normally carried by, and slidable upwardly upon, said stub shaft 35.

In Fig. 1 said sleeve 37 is shown in its lowered position, surrounding the shaft 36 and the tongue 26 of the shaft 2, in order to prevent disengagement between said tongue 26 and shaft 35 when the shafts 2 and 35 are in operative driving connection with each other.

When it is desired to swing the shaft 35 out of axial alinement with the shafts 2 and 32, the sleeve 37 may be raised, as illustrated in Fig. 3, and locked against the shaft 35 by forcing the ball 40 in the groove 41 of the shaft 35. Thereafter the shaft 35 may be disconnected from the shaft 2 and swung out of axial alinement, as shown in dotted lines in Fig. 2, and hooked by the hook 36.

In the preferred use of the present device, in talking moving pictures, it is desirable that talking or other sound records be utilized in duplicate and when so used only one record is actually transmitted sound through magnetic pickups, such as are diagrammatically indicated at 39—39 for transmission through suitable tone amplifying apparatus, not shown, but well known in this art.

In this use one record, while silent, is kept in synchronized action with the active record, whereby it may be switched into circuit and the active one switched out, should one or the other of the records become impaired during use.

The upper end of shaft 32 may be provided with further sleeving means for additional superposed turntables, not shown, such additional sleeves being indicated and indexed as for those previously described.

A suitable means, such as a pivoted hook 36, Fig. 2, mounted upon the bracket arm 28, may be utilized to hold the stub shaft 35 and sleeve 37 in disconnected position, as shown, when record changes are being made.

Thus, it will be noted that I have provided means for utilizing a single phonograph driving mechanism for disconnectably driving a plurality of superposed phonograph records all located in vertical alinement in a single axis.

From the disclosure it will further be ascertained that this advantageous device is obtained with few and simple parts, and can be easily amplified for operating a greater number of duplicate records, if so desired.

I claim:

1. In a machine of the class described, including, in combination, a driving mechanism having a driving shaft, a jointed shaft disconnectable with said driving shaft and normally in alinement therewith, superimposed turntables supporting sound records mounted on said shafts and means whereby said jointed shaft may be swung and held out of alinement for removing and replacing a sound record on said driving shaft.

2. A machine of the class described, including, in combination, a driving mechanism having a shaft, a bracket supporting said mechanism, a bracket arm projecting from said bracket having a bearing, and a compound pivotally jointed shaft journalled in said bearing and disconnectably and operatively associated with said driving shaft, and turntables mounted on said jointed and driving shafts adapted to be driven in unison thereby.

3. In a machine of the class described, including, in combination, a driving mechanism having a driving shaft, a bracket supporting said mechanism having an arm comprising a bearing, a hingedly articulated shaft journalled in said bearing and disconnectable with said driving shaft, and superimposed turntables adapted to be driven in unison by said shafts.

4. In a machine of the class described, including, in combination a driving mechanism having a driving shaft, a bracket supporting said mechanism including an arm having a bearing, an articulated broken shaft in superimposed axial alinement with said driving shaft and journalled in said bearing, slidable means detachably disconnecting said driving and articulated shafts, means carried by said arm for holding said articulated shaft out of alinement with said driving shaft, and superimposed turntables mounted on said shafts adapted to be driven in unison.

5. In a machine of the class described, including, in combination, a driving mechanism having a driving shaft, a bracket supporting said mechanism including an arm having a bearing, a pivotally jointed shaft journalled in said bearing in superimposed axial alinement with said driving shaft, slidable encompassing means operatively disconnectably holding said pivotally jointed and driving shafts, and superimposed turntables mounted on said shafts adapted to be driven in unison.

6. In a machine of the class described, a driving mechanism, having a driving shaft, a pivotally jointed shaft disconnectable with said driving shaft, and turntables in vertical axial alinement mounted on said shafts and actuated thereby.

7. In a machine of the class described, a driving mechanism having a driving shaft, a pivotally jointed shaft, operatively disconnectable with said driving shaft and superimposed turntables mounted on said shafts and actuated thereby.

8. In a machine of the class described, a driving mechanism having a driving shaft, a pivotally jointed shaft operatively connected with said driving shaft comprising a stub shaft having a tongue, a complementary superimposed alined shaft having a recess, means pivotally holding said tongue within said recess, slidable means disconnectably holding said driving and jointed shafts in axial alinement and superimposed turntable means actuated by said driving and jointed shafts in unison.

9. In a machine of the class described, a driving mechanism having a driving shaft, a pivotally jointed shaft in superimposed alinement disconnectable with said driving shaft comprising a stub shaft having a tongue, a complementary superimposed alined shaft having a recess, means pivotally holding said tongue within said recess, a bracket for supporting said mechanism having an arm comprising a bearing rotatably supporting said jointed shaft, a slidable sleeve operatively connecting said jointed shaft with said driving shaft and disconnectable with driving shaft and turntable means adapted to be actuated by said driving and jointed shafts in unison.

10. In a machine of the class described, a driving mechanism having a driving shaft, a pivotally jointed shaft in superimposed alinement disconnectable with said driving shaft comprising a stub shaft having a tongue, a complementary superimposed alined shaft having a recess, a bracket supporting said mechanism, an arm extending from said bracket comprising a bearing adapted to journal said jointed shaft, slidable encompassing means operatively connecting said driving and disconnectable pivotally jointed shafts in alinement and means carried by said arm for holding said disconnectable shaft out of alinement with said driving shaft.

11. In a machine of the class described, including, in combination, a driving mechanism having a driving shaft adapted to rotatably support a turntable having a sound record, a jointed shaft adapted to support superimposed sound records, normally in axial alinement with said driving shaft, and disconnectable with said driving shaft, and means whereby said jointed shaft may be swung out of alinement for removing and replacing said sound record on said driving shaft, and slidable means operatively holding said jointed and driving shafts in vertical alinement.

12. In a machine of the class described a plurality of superimposed turntables, a shaft consisting of connected segments for driving one or more of said turntables, and means surrounding the connected ends of the adjacent segments of the shaft to prevent disengagement of said segments.

13. In a machine of the class described a plurality of superimposed turntables, a shaft consisting of connected segments for driving said turntables in unison, and an adjustable sleeve surrounding the connected ends of the adjacent segments of the shaft to prevent disengagement of said segments from each other when the shaft is in operative driving connection.

14. A phonograph comprising a plurality of superimposed turntables, a segmental shaft driven means for driving one or more of said turntables, one end of each segment of the shaft being slotted and the other end of said segment being tongued, whereby the tongue of one segment will fit into the slot of the adjacent segment, and means to prevent disengagement of said segments when the shaft is in operative driving connection.

15. A phonograph comprising a plurality of superimposed turntables, a segmental shaft for driving said turntables in unison, one end of each segment of the shaft being slotted and the other end of said segment being tongued, whereby the tongue of one segment will fit into the slot of the adjacent segment, and an adjustable sleeve surrounding said tongue and slot jointure to prevent disengagement of said segments from each other when the shaft is in operative driving connection.

16. In a machine of the class described a plurality of superimposed turntables, a segmental shaft with a groove on each segment for driving one or more of said turntables, the end of one segment interlocking with the end of the adjacent segment, and an adjustable sleeve surrounding the interlocking jointure of said segments to prevent disengagement thereof when the shaft is in driving connection, said sleeve being slidable upwardly for locking it against said groove so that such segment of the shaft with the sleeve locked thereon may be swung out of axial alinement when desired.

Signed at New York, in the county of New York and State of New York, this 1st day of May, A. D. 1929.

ANTONIO ORANGES.